United States Patent
Auth et al.

(10) Patent No.: US 6,636,319 B1
(45) Date of Patent: Oct. 21, 2003

(54) SPECTROMETER WITH DUAL DIGITIZER FOR HIGH-DYNAMIC RANGE SPECTROSCOPIC DATA COLLECTION

(76) Inventors: Gerald Auth, 2858 Chillon Way, Laguna Beach, CA (US) 92651; Roger Haddad, 3091 Sagewood La., Corona, CA (US) 92882; Warren Vidrine, 26545 Camino de Vista N., San Juan Capistrano, CA (US) 92675

( * ) Notice: Subject to any disclaimer, the term of this patent is extended or adjusted under 35 U.S.C. 154(b) by 0 days.

(21) Appl. No.: 09/762,752

(22) PCT Filed: Aug. 10, 1999

(86) PCT No.: PCT/US99/18272

§ 371 (c)(1),
(2), (4) Date: May 4, 2001

(87) PCT Pub. No.: WO00/09970

PCT Pub. Date: Feb. 24, 2000

Related U.S. Application Data
(60) Provisional application No. 60/095,902, filed on Aug. 10, 1998.

(51) Int. Cl.[7] ................................ G01B 9/02
(52) U.S. Cl. .................. 356/451; 356/450; 250/339.07; 250/339.08
(58) Field of Search ................................ 356/450, 451; 250/339.07, 339.08

(56) References Cited

U.S. PATENT DOCUMENTS

| | | | | |
|---|---|---|---|---|
| 5,187,538 A | * | 2/1993 | Iwamoto et al. | 356/450 |
| 5,608,523 A | * | 3/1997 | Kalem et al. | 356/450 |
| 5,715,056 A | * | 2/1998 | Urabe et al. | 356/451 |

* cited by examiner

*Primary Examiner*—David V. Bruce
*Assistant Examiner*—Thomas R Artman
(74) *Attorney, Agent, or Firm*—Myers Dawes Andras & Sherman LLP; Joseph C. Andras

(57) ABSTRACT

A spectrometer (110) having an interferometer, a detector (120) that produces a detector signal (20), and a dual-digitizer system including two analog-to-digital converters that simultaneously digitize low-gain and high-gain versions of the detector signal, and suitable data structures and associated firmware for merging the two resulting sets of digitized data into a single, high dynamic range set of data.

20 Claims, 6 Drawing Sheets

SPECTROMETER WITH DUAL DIGITIZER FOR HIGH-DYNAMIC RANGE SPECTROSCOPIC DATA COLLECTION

This application claims the benefit of provisional application No. 60/095,902 filed Aug. 10, 1998.

BACKGROUND OF THE INVENTION

1. Field of the Invention

The invention relates generally to spectrometers and, more particularly, to a spectroscopic apparatus that digitizes an analog signal of widely varying range by combining the outputs of two or more ADCs that simultaneously digitize differently scaled versions of the same analog signal to provide a combined set of digitizations that cover the range with enhanced sensitivity and accuracy.

2. Discussion of Related Art

Spectroscopy is the science of identifying a sample's relative degree of transmission, absorption, or reflection over a range of radiation frequencies. Spectroscopy can involve various ranges of radiation, i.e. visible radiation, mid-infrared radiation, ultraviolet radiation, and so on. Everybody is familiar with visible radiation, or visible "light". Spectroscopy, however, often involves other ranges of radiation. Chemists, for example, often use mid-infrared radiation to determine the molecular content of a "sample" because different molecules absorb different amounts of the frequencies contained in such radiation. Each molecular species has a spectral "fingerprint" in the mid-infrared.

An instrument known as a spectrometer (or spectrophotometer) enables spectroscopic analysis. Earlier "dispersive" spectrometers rotated a dispersing element (grating or prism) through an arc so that all wavelengths within a desired range are presented to a detector. The industry subsequently developed spectrometers that use an interferometer to create a composite signal called an interferogram—a signal containing all frequencies in the entire spectrum—and then analyze the magnitude of each particular frequencies in that composite signal using the relatively complicated but well known mathematics of the Fourier Transform. Such interferometer-based spectrometers are often called Fourier Transform Infrared spectrometers, or simply FTIR spectrometers.

Figures 1, 2:
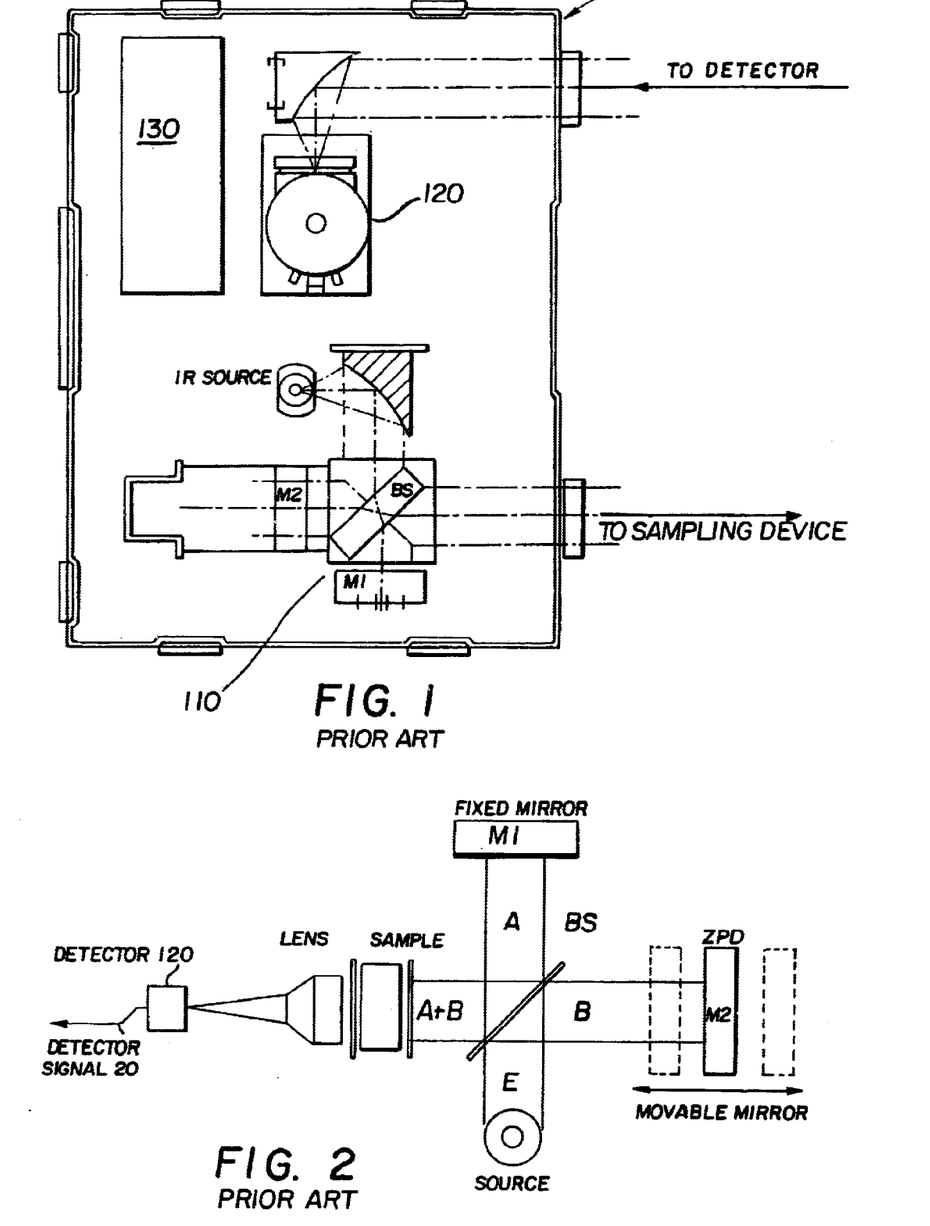
FIG. 1 shows an FTIR spectrometer 100 that may use dual-digitization according to this invention.
FIG. 2 shows how the Michelson interferometer 110 and detector 12 in the FTIR spectrometer of FIG. 1 operate to produce a detector signal.

FIG. 1 shows a typical FTIR spectrometer 100. The device shown includes an interferometer module 110, a detector 120, and suitable sampling electronics 130. The FTIR spectrometers made by the assignee of this patent application use Michelson interferometers, as do others.

FIG. 2 shows a typical Michelson interferometer 110 in more detail. The basic principles and general operation of Michelson interferometers are well known. Nonetheless, the detailed construction of an exemplary Michelson interferometer is set forth in U.S. Pat. No. 3,936,193, the entire disclosure of which is hereby incorporated by reference in its entirety.

As shown in FIG. 2, a Michelson interferometer generally comprises a beamsplitter BS (e.g. a half silvered mirror), a fixed mirror M1, and a movable mirror M2. Light from a source enters the interferometer at point E. The beamsplitter BS is placed at an angle of 45° with respect to the incoming light E such that it splits the light into two components: An "A" component travels through the beamsplitter to the fixed mirror M1. A "B" component is refelected by the beamsplitter toward the movable mirror M2. Both beams ultimately recombine (A+B) on the other side of the beam splitter, where they travel through a sample, and ultimately are focused onto a detector.

If mirrors M1 and M2 where alway at the same distance from the beamsplitter, the relative intensities of the wavelengths in the resultant beam (A+B) would be equal to their relative intensities in the initial beam E. At other unequal distances, the difference in the length of paths A and B will cause phase displacements of the various wavelengths such that, at the varying positions of movable mirror M2, each wavelength will optically interfere with itself to a degree proportional to the phase displacement resulting from such movement.

The movable mirror may be positioned at a point where the two mirrors are at an equal distance from the beam splitter, a position known as the Zero Path Difference of ZPD point. At this point, none of the incoming radiation is attenuated by phase displacement and the outgoing beam is at maximum intensity and equal to the incoming beam. During operation, the movable mirror M2 is scanned back and forth across the ZPD point position, as shown, thereby creating the interferogram by variably attenuating the plurality of wavelengths within the incoming beam E throughout its travel. Alternatively, in a different type of Michelson interferometer, a refractive wedge is interposed between the mirror M2 and the beamsplitter and moved to accomplish an interferometric scan without actually moving mirror M2.

The interferometer-modified radiation is passed through a sample or reflected from a sample, where it is further modified, and finally focused on a light sensitive detector that generates a fluctuating electrical signal, or detector signal, that is proportional to the intensity of the incident radiation.

Analog-to-digital conversion is a vital part of signal treatment because the detector signal has a very large dynamic range (i.e. is comprised of both low-level signals and high-level signals) and because accurate digitization of the low-level signals is necessary for good sensitivity and accuracy. Traditionally, this has resulted in the use of high-dynamic-range digitizers, sometimes combined with gain-switching. However, these prior approaches result in certain other problems.

High-dynamic-range digitizers are expensive, and tend to go out of adjustment over time. In particular, the monotonicity of digitization often degrades with time, especially around the zero voltage point of bipolar digitizers. Unfortunately, the low-level signal portion of instrument signals is usually near this zero voltage point, so this degradation seriously affects instrument performance. In addition, practical circuits generally have some semi-coherent noise resulting from the digital circuitry portion of the digitizer. In traditional digitizers, this noise is especially harmful because it is neither perfectly coherent (in some instruments such as the Fourier-transform infrared spectrometer, velocity variations cause the digitization rate to jitter), nor is it completely random.

Gain-switching is a method for utilizing the full range of a single digitizer during the low-level signal portion of the instrument's measurement, while preventing digitizer overflow during the high-level portion of the instrument's measurement. Gain-switching depends on a switchable-gain amplifier which must switch gain and stabilize during the short interval between digitizations (typically 10 to 30 microseconds in the case of a spectrometer). The design and commercial production of such a switch-gain amplifier is very difficult, and actual commercial realizations exist but have limitations. Maintaining exact gain, phase coherence, low noise, and zero stability over time while supplying an adequately short settling time has proven to be a formidable task.

Accordingly, there remains a need for a spectroscopic method and apparatus of using inexpensive digitizers to digitize an analog detector signal of very large dynamic range, with increased sensitivity and accuracy over that range, without requiring expensive, high-dynamic-range digitizers and without requiring gain-switching.

SUMMARY OF THE INVENTION

In a first aspect, the invention may be regarded as a method of operating an FTIR spectrometer to digitize an analog detector signal comprising the steps of passing an IR source signal through an interferometer; receiving an analog detector signal corresponding to the IR source signal; processing the analog detector signal with a low gain circuit to produce a low gain analog signal; processing the analog detector signal with a high gain circuit to produce a high gain analog signal; digitizing the low gain analog signal with a first ADC converter to produce a set of low gain samples; digitizing the high gain analog signal with a second ADC converter to produce a set of high gain samples, some of the high gain samples being below a predetermined threshold and some of the high gain samples being above the predetermined threshold; and merging the in-range high gain samples with the low gain samples to produce a combined set of samples.

In a second aspect, the invention may be regarded as a method of operating an FTIR spectrometer to digitize an analog detector signal comprising the steps of passing an IR source signal through an interferometer; receiving an analog detector signal corresponding to the IR source signal; processing the analog detector signal with a low gain circuit to produce a low gain analog signal; processing the analog detector signal with a high gain circuit to produce a high gain analog signal; digitizing the low gain analog signal with a first ADC converter to produce a set of low gain samples; digitizing the high gain analog signal with a second ADC converter to produce a set of high gain samples, some of the high gain samples being below a predetermined threshold and some of the high gain samples being above the predetermined threshold; identifying a plurality of pairs of low-gain samples and high-gain samples where the high-gain sample are below the predetermined threshold; performing a least squares fit to normalize the high-gain samples to the low-gain samples according to the equation y=Ax+B where each y value is a high-gain sample and each x value is a low-gain sample; and merging the in-range high gain samples with the low gain samples to produce a combined set of samples by using: a low-gain sample when a corresponding high-gain sample exceeds the predetermined threshold; and a high-gain sample, normalized relative to the low-gain samples as (y−B)/A, when the high-gain sample is less than the predetermined threshold.

In yet another aspect, the invention may be regarded as an FTIR spectrometer adapted for analyzing a sample with high dynamic range comprising: an interferometer for creating an interferogram from a source of IR radiation; a detector that produces an analog detector signal corresponding to the IR source signal; a low-gain circuit receiving the analog detector signal to producing a low-gain signal; a high-gain circuit receiving the analog detector signal and producing a high gain signal; a first analog-to-digital converter for digitizing the low gain signal to produce a set of low gain samples; a second analog-to-digital converter for digitizing the high gain signal to produce a set of high gain samples where some of the high gain samples are below a predetermined threshold and some of the high gain samples are above the predetermined threshold; and means for merging the high gain samples that are below the predetermined threshold with the low gain samples to produce a combined set of samples.

In alternative embodiments, the low gain circuit operates by passing the signal through unchanged or by attenuating the output of the high gain circuit.

DESCRIPTION OF DRAWINGS

The just summarized invention may best be understood with reference to the figures of which.

DETAILED DESCRIPTION OF THE PREFERRED EMBODIMENT

Figure 3:
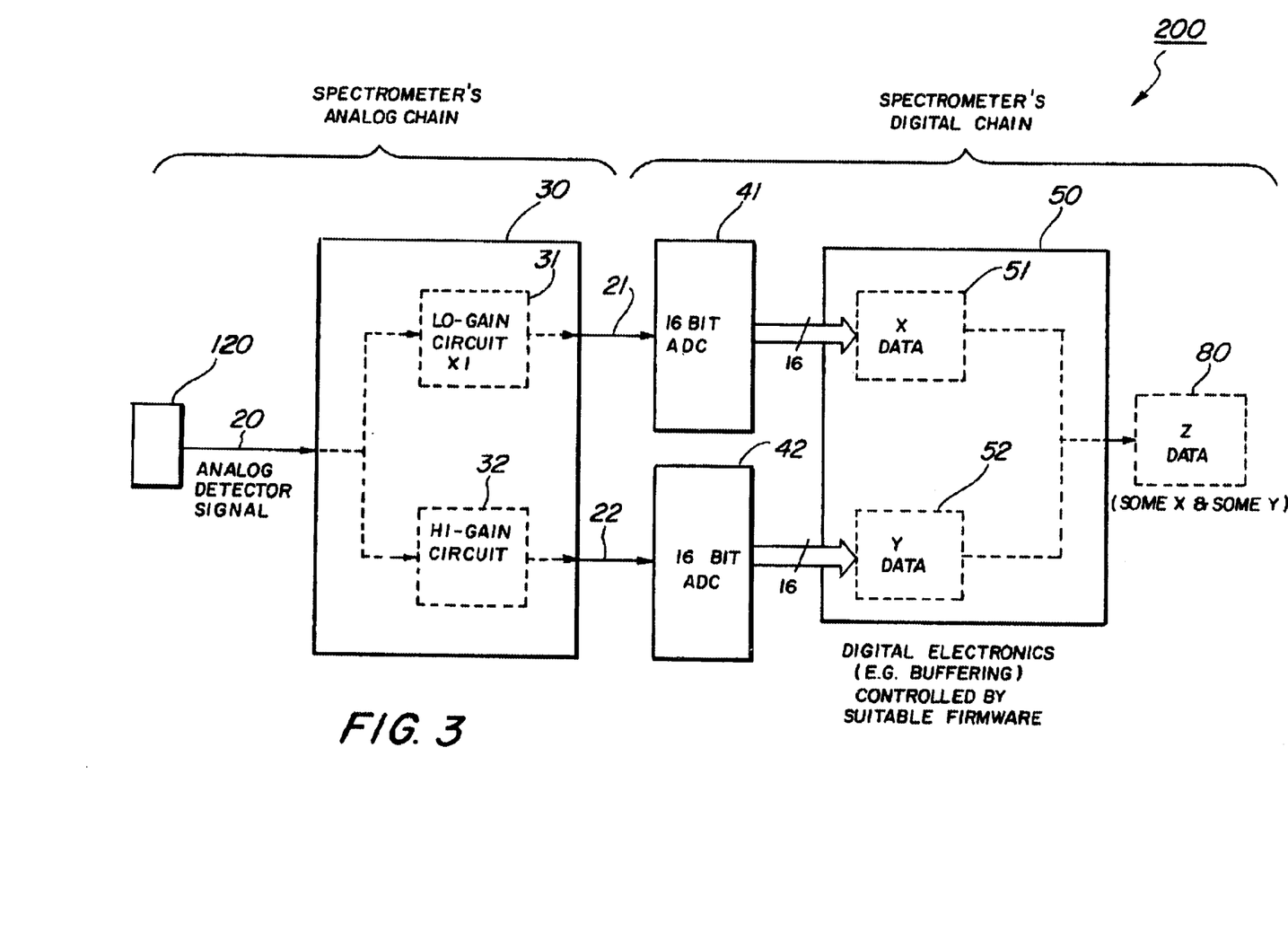
FIG. 3 is a simplified block diagram of a dual-digitizer system 10 used in a spectrometer according to a preferred embodiment of this invention.
Figure 4:
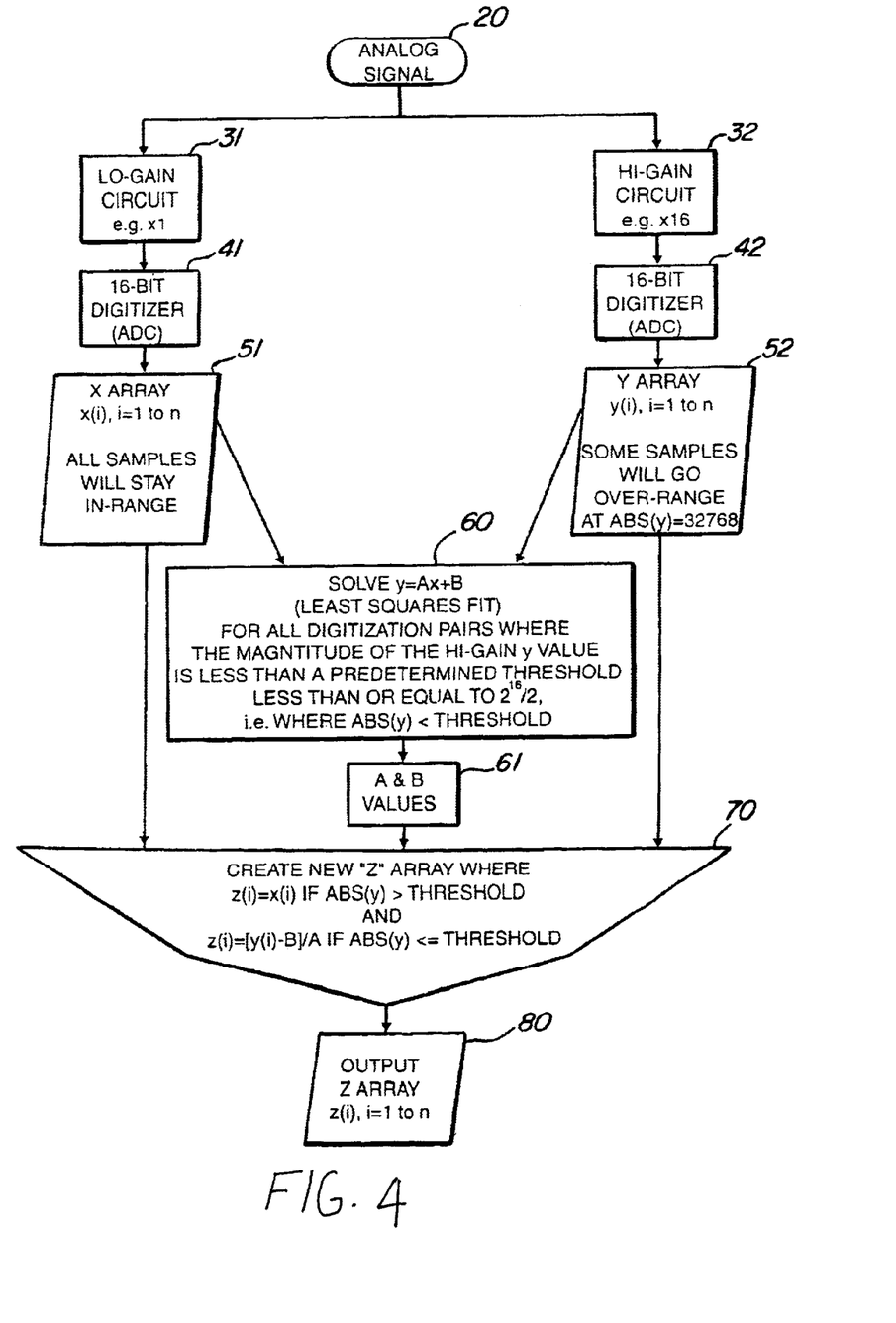
FIG. 4 is a conceptual flow chart of the steps used to merge the data from the two digitizers in the dual-digitizer system 10 of FIG. 3.
Figure 5A:
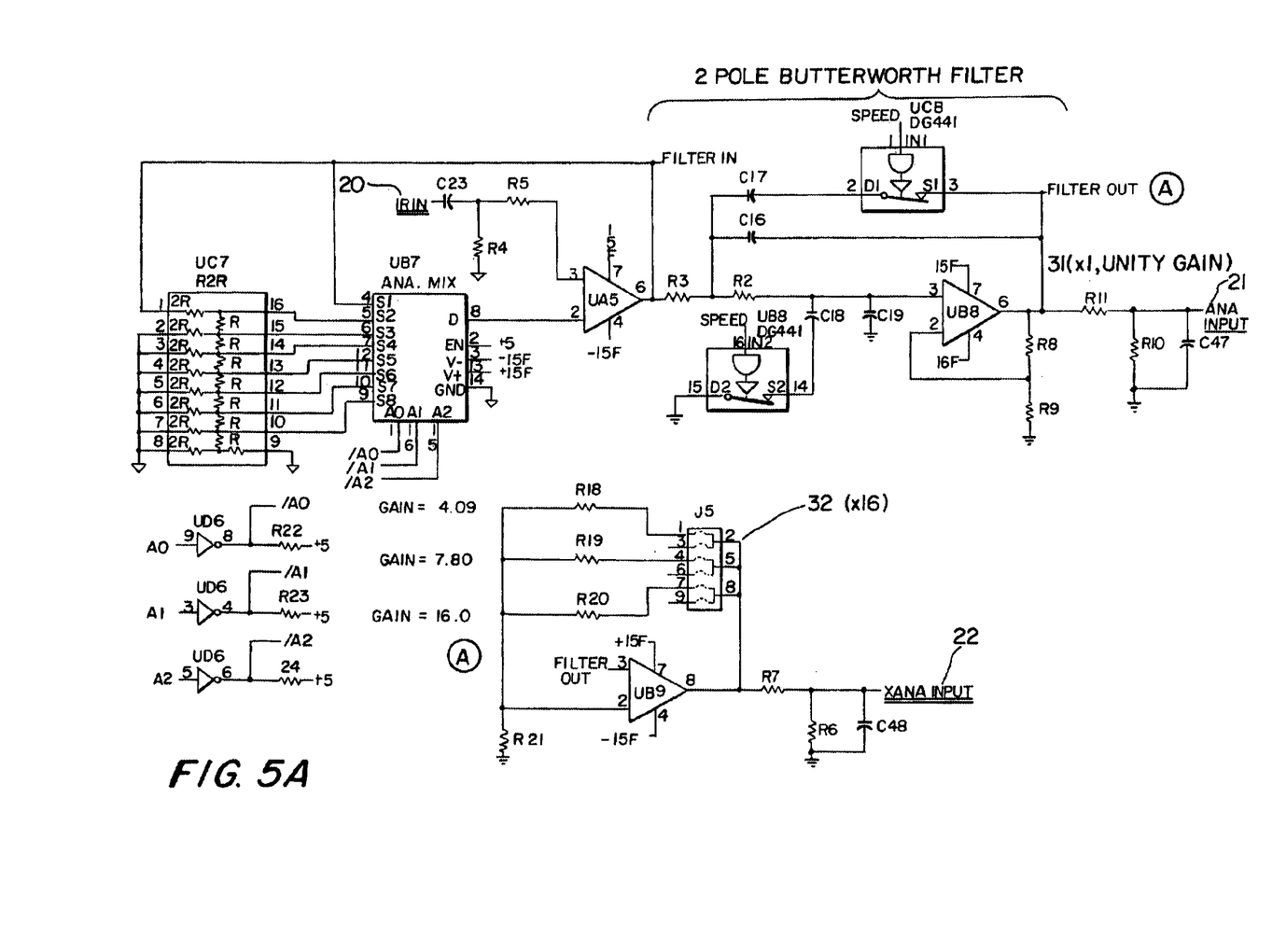
FIG. 5 (divided across 5A and 5B) is a detailed schematic diagram of the dual-digitizer system 10 of FIG. 3.
Figure 5B:
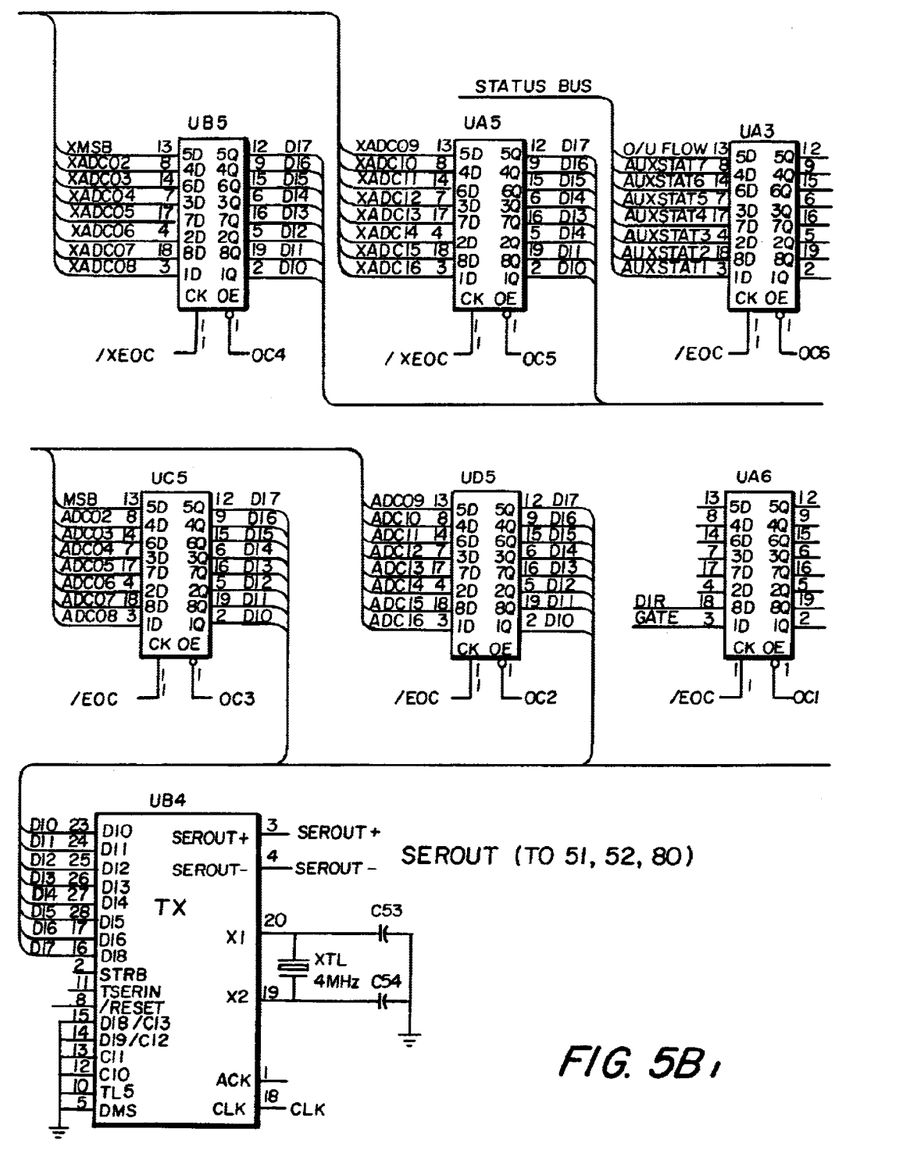
Figure 5B:
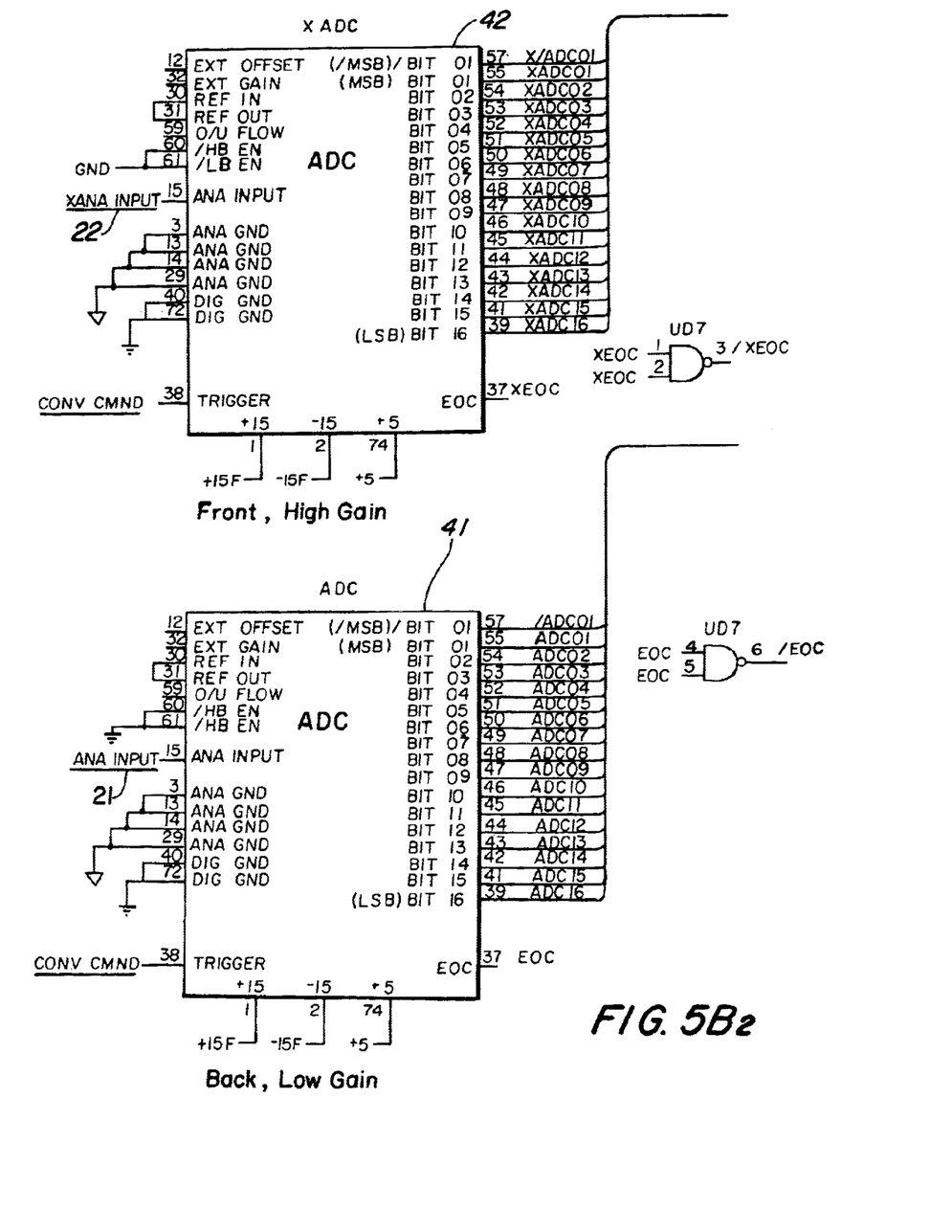

FIGS. 3, 4 and 5 show the construction and operation of dual-digitizer 200 according to one embodiment of this invention. In this representative embodiment, as best shown in FIG. 3, the dual-digitizer 200 receives the analog signal 20 from the FTIR spectrometer's detector 120 of FIGS. 1 and 2, digitizes or samples that signal, and ultimately generates a table 80 of digital data that may be analyzed with suitable Fourier techniques. In more detail, the dual-digitizer 200 includes an analog chain that leads to a digital chain:

The analog chain consists of the detector 120, an analog detector signal 20 which comes from the detector, and a gain variation system 30 which receives the analog detector signal 20 and includes first and second gain circuits 31, 32 that produce first and second scaled versions of that signal 20 as scaled signals 21, 22. In the preferred embodiment, the first gain circuit 31 is a lo-gain circuit 31 produces a first scaled signal 21 that is the same as the detector signal 20 (i.e. gain=1) and the second gain circuit 32 is a hi-gain circuit 32 that produces a second scaled signal 22 that is an amplified version of the detector signal 20 (e.g. gain=16). In the preferred embodiment, as shown in FIG. 5A discussed below, the "unity gain" amplifier making up the lo-gain circuit 31 is accomplished by omitting an amplifier altogether. Many variations are possible as to what components may reside in the gain variation system 30. For example, one amplifier may be used to amplify both signals, and the lower gain signal may be produced by passively attenuating the higher-gain signal. As yet another example, two separate amplifiers may be used.

The digital chain comprises two analog-to-digital converters (ADCs or digitizers) 41, 42 and other digital electronics 50 that, when controlled by suitable firmware, produce a combined set of digital data 80 that may be analyzed in a conventional manner using a microprocessor, a digital signal processor, and so on. This particular embodiment uses two 16-bit ADC's, with a relative gain ratio of approximately sixteen, to provide a combined digitization over the dynamic range of approximately ±524,288 to 1. As shown, the digitizers 41, 42 are each supplied with one of the scaled signals 21, 22, and they operate simultaneously to output 16-bit samples of those signals to the electronics 50 which store the lo-gain samples as "X" data 51 and the hi-gain samples as "Y" data 52. The combined set of samples are referenced as "Z" data 80 to suggest that they are formed from both the X and Y data sets 51, 52.

This embodiment uses the lo-gain samples as the "standard" because those values are always valid although not always very accurate. The hi-gain values are fit to the low-gain data since the hi-gain values are sometimes useful (i.e. in-range) and sometime not (i.e. over-ranged).

FIG. 4 is a flow chart shows the preferred method of operating the dual-digitizer 200 of FIG. 3. The FIG. 4 elements that have direct counterparts in FIG. 3 are identified with the same numbers. These elements include the analog signal 20 and the first several elements in the lo-gain and hi-gain "paths" that operate in parallel with one another, i.e. the lo-gain and hi-gain circuits 31, 32; the ADC's, 41, 42, and the parallel data sets consisting of an X array and a Y array 51, 52. As noted, the lo-gain X array 51 will contain n samples that are all in-range whereas the hi-gain Y array 51 will, due to the x16 multiplication of the hi-gain circuit 32, have some samples that are in-range and some samples that are over-ranged. In other words, for some of the higher amplitude values of the analog signal 20, the ADC 42 that pours data into the X array 52 will clip at the positive and negative "rails" of the ADC's dynamic range, i.e. at ±32, 768.

This clipping of the data in the Y array 52 leads to two distinct sets of data based on the dynamic range of the analog signal 20. For the higher-amplitudes of the analog signal 20, only the X array 51 will contain valid data. For the lower-amplitudes of the analog signal 20, both the X and Y arrays 51, 52 will contain valid data. The dual-digitizer 200 merges these two sets 51, 52 of data so that inexpensive, readily available ADCs 41, 42 may produce a combined set of digital data 80 that has sufficient dynamic range to more accurately represent the analog signal 20.

As further shown in FIG. 4, therefore, the dual-digitizer 200 comprises digital algorithmic means 60 to dynamically determine the relative gain ratio A and offset B of the two digitized signals (as suggested by block 61), and then uses these factors A, B in a merging block 70 to normalize the recorded signals x(i) and y(i) and merge them into a single set of data 80 forming high-dynamic-range record z(i) of the instrument signal 20.

In block 60, a means for pairing the lo-gain data 51 with the hi-gain data 52 is disclosed. In the preferred embodiment, the lo-gain data 51 and hi-gain data 52 are searched, and all measurement pairs having signal levels which are within the dynamic range of the high-gain digitizer 52 are marked. The high-gain data and low-gain data are then compared point-by-point for all marked points and a least-squares fit to y=Ax+B is made, producing calculated values for the relative gain ratio A and the offset B. Preferably, the marged pairs are based on a hi-gain signal value that is well within the dynamic range of the hi-gain digitizer 52. For this purpose, a THRESHHOLD may be established where the threshhold is set at a value that is lower than the absolute maximum value found at the rails of the hi-gain digitizer 52. The THRESHOLD, for example, may be set to 32256 rather than to 32768. Staying away from the rails avoids an area of digitization that is subject to noise and, moreover, allows the hi-gain Y values 52 to be offset so that the most critical information around the zero-crossing point is not digitized to zero where certain other instability issues exist. Although this embodiment only contemplates only two digitizers and two distinct ranges, it may be desirable to include a third digitizer and/or a second, intermediate transition range.

In block 70, the dual-digitizer 200 merges the X and Y records 51, 52 by using the low-gain X data 51 for all high-level measurement points (e.g. whenever the hi-gain Y data 52 is above the threshold of ±32256) and by using the high-gain Y data 52, normalized to the X data 51 with A and B, for the low-level measurement points. The gain ratio A scales the slope of the Y line to match the X line. The offset B ensures that the Y line intersects magnitude axis at the same point as the X line. Together, A and B allow the system to digitally stitch the X data to the Y data to form the Z data.

It may also be desirable to perform a validity check between each low-gain value x(i) and each corresponding and normalized high gain value (y(i)−B)/A. The validity check could be as simple as verifying that x(i) and (y(i)−B)/A are within 1.5 lo-gain steps of each other for all y(i) that are less than the THRESHOLD. The possible actions taken in response to an out of range value are varied and could include, for example, interpolating between the nearest pair of valid values.

The resulting combination of data, or Z data 80, has a dynamic range of ±524,288 to 1 (total 1,048,576 to 1), while utilizing inexpensive monolithic analog-to-digital converters.

FIG. 5 (broken across 5A and 5B) schematically shows an actual implementation of the dual-digitizer 200 of FIGS. 3 and 4, including the gain 1 and gain 16 amplifiers that correspond go the lo-gain and hi-gain circuits 31, 32. In FIG. 5. The detector signal 20 enters this circuit at the point labeled "IR IN" and is then amplified according to the gain setting specified by device "UC7". The amplified signal is analog filtered by the circuitry identified as "2 POLE BUTTERWORTH FILTER". From the circuit point specified as "FILTER OUT", the signal follows one of two paths. In the first path, gain 1 amplification is accomplished by simply omitting the amplifier, and the signal is then passively low-pass filtered by the circuit comprised by the elements "R11", "R10", and "C47" to produce the signal "ANA" corresponding to the lo-gain signal 21 of FIG. 3. In the second path, it is amplified by the gain-selectable operational amplifier "UB9" and then similarly low-pass filtered by the elements "R7", "R8", and "C48" to produce the amplified signal "XANA" corresponding to the hi-gain signal 22 of FIG. 3. In FIG. 5B, the ANA signal 21 is input into the low-gain digitizer "ADC1" corresponding to ADC 41 of FIG. 3, and the "XANA" signal 22 is input into the high-gain digitizer"ADC2" corresponding to ADC 42 of FIG. 3. Both digitizers 41, 42 are simultaneously triggered by the same trigger signal "CONV CMND", and their digital outputs are converted into a serial data stream "SEROUT". It is understood that additional analog circuitry precedes the amplifiers and that additional digital circuitry follows the digitizers, but such circuitry is relatively conventional, varies from embodiment to embodiment, is essentially self-explanatory to those of ordinary skill in the art, and is not necessary to fully understand this invention.

Numerous variations are possible within the scope of the hereafter claimed invention. As one example, more than two analog-to-digital converters may be used and more than two digital signal streams may be merged into a single record. As another example, a merging algorithm other than a simple least squares fit may be used to merge the records. The merging algorithm may also incorporate methodology for linearizing the detector signal. Finally, some of the tasks (e.g., marking points and calculating the normalization constants) may be performed simultaneously using algorithmic concatenation. As yet another example, a multichannel digitizer may be used for simultaneously digitizing multiple signals.

We claim:

1. A method of operating an FTIR spectrometer to digitize an analog detector signal comprising the steps of:
    passing an IR source signal through an interferometer;
    receiving an analog detector signal corresponding to the IR source signal;
    processing the analog detector signal with a low gain circuit to produce a low gain analog signal;
    processing the analog detector signal with a high gain circuit to produce a high gain analog signal;
    digitizing the low gain analog signal with a first ADC converter to produce a set of low gain samples;
    digitizing the high gain analog signal with a second ADC converter to produce a set of high gain samples, some of the high gain samples being below a predetermined threshold and some of the high gain samples being above the predetermined threshold; and
    merging the in-range high gain samples with the low gain samples to produce a combined set of samples by:
        identifying a plurality of pairs of low-gain and high-gain samples where the high-gain samples are below the predetermined threshold;
        normalizing the high-gain samples relative to the low-gain samples; and
        assembling a combined set of low-gain sample and high-gain samples.

2. The method of operating an FTIR spectrometer of claim 1:
    wherein the step of processing the analog detector signal with a high gain circuit to produce a high gain analog signal is accomplished with an amplifier; and
    wherein the step of processing the analog detector signal with a low gain circuit to produce a low gain analog signal is accomplished with a unity gain circuit.

3. A method of operating an FTIR spectrometer to digitize an analog detector signal comprising the steps of:
    passing an IR source signal through an interferometer;
    receiving an analog detector signal corresponding to the IR source signal;
    processing the analog detector signal with a low gain circuit to produce a low gain analog signal;
    processing the analog detector signal with a high gain circuit to produce a high gain analog signal;
    digitizing the low gain analog signal with a first ADC converter to produce a set of low gain samples;
    digitizing the high gain analog signal with a second ADC converter to produce a set of high gain samples, some of the high gain samples being below a predetermined threshold and some of the high gain samples being above the predetermined threshold;
    merging the in-range high gain samples with the low gain samples to produce a combined set of samples;
    wherein the step of processing the analog detector signal with a high gain circuit to produce a high gain analog signal is accomplished with an amplifier; and
    wherein the step of processing the analog detector signal with a low gain circuit to produce a low gain analog signal is accomplished by attenuating the high gain analog signal with an attenuator.

4. The method of operating an FTIR spectrometer of claim 1:
    wherein the step of processing the analog detector signal with a high gain circuit to produce a high gain analog signal is accomplished with a high-gain amplifier; and
    wherein the step of processing the analog detector signal with a low gain circuit to produce a low gain analog signal is accomplished with a low-gain amplifier.

5. The method of operating an FTIR spectrometer of claim 1 wherein the step of normalizing the high-gain samples relative to the low-gain samples comprises the substep of performing a least squares fit to normalize the high-gain samples to the low-gain samples according to the equation y=Ax+B where each y value is a high-gain sample and each x value is a low-gain sample.

6. The method of operating an FTIR spectrometer of claim 1 wherein the step of assembling a combined set of low-gain sample and high-gain samples comprises the substeps of:
    using a low-gain sample when a corresponding high-gain sample exceeds the predetermined threshold; and
    using a high-gain sample, normalized relative to the low-gain samples, when the high-gain sample is less than the predetermined threshold.

7. A method of operating an FTIR spectrometer to digitize an analog detector signal comprising the steps of:
    passing an IR source signal through an interferometer;
    receiving an analog detector signal corresponding to the IR source signal;
    processing the analog detector signal with a low gain circuit to produce a low gain analog signal;
    processing the analog detector signal with a high gain circuit to produce a high gain analog signal;
    digitizing the low gain analog signal with a first ADC converter to produce a set of low gain samples;
    digitizing the high gain analog signal with a second ADC converter to produce a set of high gain samples, some of the high gain samples being below a predetermined threshold and some of the high gain samples being above the predetermined threshold;
    identifying a plurality of pairs of low-gain samples and high-gain samples where the high-gain sample are below the predetermined threshold;
    performing a least squares fit to normalize the high-gain samples to the low-gain samples according to the equation y=Ax+B where each y value is a high-gain sample and each x value is a low-gain sample; and
    merging the in-range high gain samples with the low gain samples to produce a combined set of samples by using:
        a low-gain sample when a corresponding high-gain sample exceeds the predetermined threshold; and
        a high-gain sample, normalized relative to the low-gain samples as (y−B)/A, when the high-gain sample is less than the predetermined threshold.

8. A method of operating an FTIR spectrometer to digitize an analog detector signal comprising the steps of:
    passing an IR source signal through an interferometer;
    receiving an analog detector signal corresponding to the IR source signal;

processing the analog detector signal with a low gain circuit to produce a low gain analog signal;

processing the analog detector signal with a high gain circuit to produce a high gain analog signal;

digitizing the low gain analog signal with a first ADC converter to produce a set of low gain samples;

digitizing the high gain analog signal with a second ADC converter to produce a set of high gain samples, some of the high gain samples being below a predetermined threshold and some of the high gain samples being above the predetermined threshold;

identifying a plurality of pairs of low-gain samples and high-gain samples where the high-gain sample are below the predetermined threshold;

performing a least squares fit to normalize the low-gain samples to the high-gain samples according to the equation y=Ax+B where each y value is a low-gain sample and each x value is a high-gain sample; and merging the in-range high gain samples with the low gain samples to produce a combined set of samples by using:

a normalized low-gain sample when a corresponding high-gain sample exceeds the predetermined threshold; and a high-gain sample when the high-gain sample is less than the predetermined threshold.

9. An FTIR spectrometer adapted for analyzing a sample with high dynamic range comprising:

an interferometer for creating an interferogram from a source of IR radiation;

a detector that produces an analog detector signal corresponding to the IR source signal;

a low-gain circuit receiving the analog detector signal and producing a low-gain signal;

a high-gain circuit receiving the analog detector signal and producing a high gain signal;

a first analog-to-digital converter for digitizing the low gain signal to produce a set of low gain samples;

a second analog-to-digital converter for digitizing the high gain signal to produce a set of high gain samples where some of the high gain samples are below a predetermined threshold and some of the high gain samples are above the predetermined threshold; and means for merging the high gain samples that are below the predetermined threshold with the low gain samples to produce a combined set of samples, wherein the means for merging the high gain samples with the low gain samples further comprises:

means for storing a full set of low-gain samples;
means for storing a full set of high-gain samples; and
means for pairing the low-gain samples with high-gain samples that are below the predetermined threshold.

10. The FTIR spectrometer of claim 9 wherein the low-gain circuit receiving the analog detector signal and producing a low-gain signal is an amplifier.

11. The FTIR spectrometer of claim 9 wherein the low-gain circuit receiving the analog detector signal and producing a low-gain signal is an amplifier of unity gain.

12. An FTIR spectrometer adapted for analyzing a sample with high dynamic range comprising:

an interferometer for creating an interferogram from a source of IR radiation;

a detector that produces an analog detector signal corresponding to the IR source signal;

a low-gain circuit receiving the analog detector signal to and producing a low-gain signal;

a high-gain circuit receiving the analog detector signal and producing a high gain signal;

a first analog-to-digital converter for digitizing the low gain signal to produce a set of low gain samples;

a second analog-to-digital converter for digitizing the high gain signal to produce a set of high gain samples where some of the high gain samples are below a predetermined threshold and some of the high gain samples are above the predetermined threshold;

means for merging the high gain samples that are below the predetermined threshold with the low gain samples to produce a combined set of samples; and wherein the low-gain circuit receiving the analog detector signal and producing a low-gain signal is an attenuator.

13. The FTIR spectrometer of claim 9 wherein high-gain circuit receiving the analog detector signal and producing a high gain signal is an amplifier.

14. An FTIR spectrometer adapted for analyzing a sample with high dynamic range comprising:

an interferometer for creating an interferogram from a source of IR radiation;

a detector that produces an analog detector signal corresponding to the IR source signal;

a low-gain circuit receiving the analog detector signal to and producing a low-gain signal;

a high-gain circuit receiving the analog detector signal and producing a high gain signal;

a first analog-to-digital converter for digitizing the low gain signal to produce a set of low gain samples;

a second analog-to-digital converter for digitizing the high gain signal to produce a set of high gain samples where some of the high gain samples are below a predetermined threshold and some of the high gain samples are above the predetermined threshold;

means for merging the high gain samples that are below the predetermined threshold with the low gain samples to produce a combined set of samples; and wherein high-gain circuit receiving the analog detector signal and producing a high gain signal is an attenuator.

15. The FTIR spectrometer of claim 9 wherein the means for merging the high gain sample with the low gain samples comprises:

digital circuitry; and
suitable firmware for controlling the digital circuitry.

16. The FTIR spectrometer of claim 9 wherein the predetermined threshold is less than or equal to the maximum range of the second analog to digital converter.

17. The FTIR spectrometer of claim 16 wherein the second analog to digital converter is a 16-bit converter and wherein the predetermined threshold is set to 32,256.

18. The FTIR spectrometer of claim 9 further comprising means for fitting the high-gain samples to the low-gain samples.

19. The FTIR spectrometer of claim 18 wherein the means for fitting the high-gain samples to the low-gain samples using a least squares fit to a straight line.

20. The FTIR spectrometer of claim 18 wherein the means for fitting the low-gain samples to the high-gain samples using a least squares fit to a straight line.

* * * * *